United States Patent [19]

Chen

[11] Patent Number: 6,017,970
[45] Date of Patent: Jan. 25, 2000

[54] METHOD FOR RECYCLING DISCARDED ARTICLES

[76] Inventor: Der-Shyan Chen, No. 19-2, 2 Pin, 5 Lin, Ta Hsi Vill. Tsao Chiao Hsiang, Miao Li Hsien, Taiwan

[21] Appl. No.: 09/081,076

[22] Filed: May 19, 1998

Related U.S. Application Data

[63] Continuation of application No. 08/740,396, Oct. 29, 1996, abandoned.

[51] Int. Cl.[7] .................................................. C08J 11/04
[52] U.S. Cl. .............................. 521/41; 521/40; 521/40.5; 521/45.5; 521/48; 521/49; 264/37; 264/DIG. 69; 428/903.3
[58] Field of Search ............................... 521/41, 40, 40.5, 521/45.5, 48, 49; 264/37, DIG. 69; 428/903.3

[56] References Cited

U.S. PATENT DOCUMENTS 5,075,057 12/1991 Hoedl ...................................... 264/115

*Primary Examiner*—James J. Seidleck
*Assistant Examiner*—Olga Asinovsky
*Attorney, Agent, or Firm*—Browdy and Neimark

[57] ABSTRACT

A method for recycling discarded articles comprising sorting the discarded articles into thermoplastic, thermosetting, and rubber articles, crushing the discarded articles to form thermosetting granules, thermoplastic granules, and rubber granules, and depositing the granules into a molding tool. The molding tool is heated under pressure such that the thermoplastic granules melt, and the molding tool is abruptly cooled to cause the molting material to assume a shape in the molding tool.

9 Claims, No Drawings

METHOD FOR RECYCLING DISCARDED ARTICLES

This application is a continuation of application Ser. No. 08/740,396, filed Oct. 29, 1996, now abandoned the entire contents of which are hereby incorporated by reference.

FIELD OF THE INVENTION

The present invention relates generally to a method for disposing of discarded articles, and, more particularly, to a method for recycling discarded articles.

BACKGROUND OF THE INVENTION

Discarded articles, such as plastic bags, rugs, and articles made from materials such as vulcanized rubber, EVA foam, polyethylene foam, or thermosetting resin materials, are not easily disposed of. Discarded articles made of these materials are generally disposed of by incineration or dumping in a landfill. Landfills can pollute ground water and soil, and incineration results in generation of ashes, which must be disposed of properly.

The most environmentally friendly way to dispose of discarded articles is to recycle the discarded articles. There are various patented methods for recycling discarded articles. However, these conventional methods are generally not completely satisfactory, in that they are suitable for recycling only certain types of solid articles, and they are not cost-effective. Moreover, they are incapable of totally disposing of discarded articles.

SUMMARY OF THE INVENTION

It is the primary objecting of the present invention to provide an improved method for recycling discarded articles. The improved method is capable of totally recycling the discarded articles without leaving any residue.

It is another objective of the present invention to provide an improved method for recycling discarded articles. The improved method can produce a recycled material having the characteristics of a composite material.

It is still another objective of the present invention to provide an improved method for recycling discarded articles. This improved method is both economical and efficient.

The foregoing objectives of the present invention are achieved by initially sorting discarded articles before they are crushed into granules. The granules are then deposited in a predetermined ratio in a molding tool, which is then subjected to heat and pressure for a predetermined length of time sufficient to melt the thermoplastic pieces. The molding tool is then cooled abruptly to room temperature to shape the molten material.

The foregoing objectives, features, functions, and advantages will be more readily understood upon thoughtful study of the following detailed description of a preferred embodiment o the present invention.

DETAILED DESCRIPTION OF THE INVENTION

The method of the preferred embodiment of the present invention comprises the following steps, which are described explicitly hereinafter:

(1) Discarded articles made of ethylene vinyl acetate, polyethylene, or polyurethane foam material, discarded tires, discarded articles made of thermoplastic or thermosetting materials, and discarded rugs are first sorted into a thermoplastic plastic group, a thermosetting plastic group, and a rubber group. These groups are rinsed and dried prior to being crushed and shredded into granules and fibrous fragments. The granules are under 3 mm in size, and the fibrous fragments are under 10 mm in size.

(2) A mixture is formed of the plastic granules, the rubber granules, and the fibrous fragments in the ratio of 5:3:2. The mixture is then arranged in the mold cavity of a molding tool, which is subsequently heated to a temperature ranging between 160 and 220° C. under a pressure ranging from 50 kg/cm to 100 kg/cm for at least one minute. The molten material forms a matrix. In the meantime, the unmelted fibrous fragments and granular foam material are encapsulated in the material to serve as the reinforcing materials of a mew composite material which is formed in the molding tool.

(3) The freshly formed composite material is then cooled abruptly so as to assume a form. The cooling effect may be brought about by water or by a water-cooling system which is part of the molding tool in which the new composite material is formed. The cooling period depends on the volume and the heat conductivity coefficient of the material to be cooled. Generally, the optimum cooling temperature ranges between 10 and 15° C., while the optimum cooling period ranges between one and five minutes.

The abrupt cooling of the composite material, i.e., cooling the composite material from a temperature of 160–220° C. to 10 to 15° C. in a period of from one to five minutes produces a composite material with a well-defined form. The abrupt cooling process quickly lowers the temperature of the molten granules to below the melting point of each type of plastic material. As a result, the molten granules are molded quickly into the desired form and can easily be removed form the molding tool. Without this rapid cooling, plastic materials which have relatively low melting points, or which have melting points below that of other plastic materials in the mixture, will stick to the surface of the molding tool and are difficult to remove from the molding tool.

Additionally, the abrupt cooling which is critical to the present invention aids in encapsulating unmelted fibrous fragments and granules of thermosetting plastics in the molten mass in the molding tool. The abrupt cooling provides superior recycling of discarded articles without requiring addition of any chemical agents such as foaming agents, plasticizers, etc.

It must be noted here that the plastic granules referred to above may consist of 100% of thermoplastic granules, or a mixture of thermoplastic plastic granules and thermosetting plastic granules in a ratio of 4:1.

The method of the present invention has inherent advantages, which are expounded hereinafter.

The method of the present invention forms a new composite material containing an appropriate amount of fiber and plastics and having an appropriate rigidity and an appropriate elasticity. As a result the new composite material made by the method of the present invention is suitable for use as a material for making the toe portion of the pad of footwear, as well as desk pads, cup pads, garbage cans, flower pots, floor mats, etc.

The method of the present invention is environmentally sound because it uses no chemical agent.

The method of the present invention is simple and cost-effective.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation.

What is claimed is:

1. A method for recycling discarded articles selected from the group consisting of thermoplastic, thermosetting and rubber articles and mixture thereof, said method comprising the steps of:

(a) sorting the discarded articles into groups comprising a first plastic group comprising thermoplastic articles, a second plastic group comprising thermosetting articles, and a rubber group comprising rubber articles;

(b) crushing the first plastic group, the second plastic group, and the rubber group into granules having a size ranging from 3 mm and 10 mm and containing optional fibrous fragments;

(c) depositing said granules of said first and second plastic groups and said rubber group into a molding tool;

(d) heating said molding tool to a temperature ranging from 160 to 220° C. under pressure for sufficient time to melt the thermoplastic granules in said first plastic group; and (e) abruptly cooling the molten granules in a period of from one to five minutes to a temperature of from 10–15° C. to cause the molten granules to assume the form of the mold at room temperature.

2. A method according to claim 1 further comprising a rinsing and drying step between step (a) and step (b).

3. A method according to claim 1 wherein said discarded articles are crushed into granules in step (b) such that some of said discarded articles are crushed into granules and some of said discarded articles are shredded into fibrous fragments.

4. A method according to claim 3, wherein said granules comprise plastic granules consisting of granules from said first plastic group or granules from said second plastic group, or mixtures thereof; rubber granules; and fibrous fragments in the ratio of 5:3:2.

5. A method according to claim 4, wherein said plastic granules are composed of thermoplastic granules and thermosetting granules.

6. A method according to claim 5, wherein said plastic granules are composed of thermoplastic granules and thermosetting granules in the ratio of 4:1.

7. A method according to claim 1, wherein and the pressure in step (d) ranges from 50 kg/cm to 100 kg/ and wherein the heating step lasts at least one minute.

8. A method according to claim 1, wherein said discarded articles are selected from the group consisting of articles made from ethylene vinyl acetate, polyethylene foam, polyurethane foam, thermosetting plastic, thermoplastics, rubber, and mixtures thereof.

9. A method according to claim 1, wherein said abrupt cooling is effected by water or a water-cooling system.

* * * * *